(No Model.)
S. R. DRESSER.
PIPE COUPLING.
No. 406,035. Patented July 2, 1889.
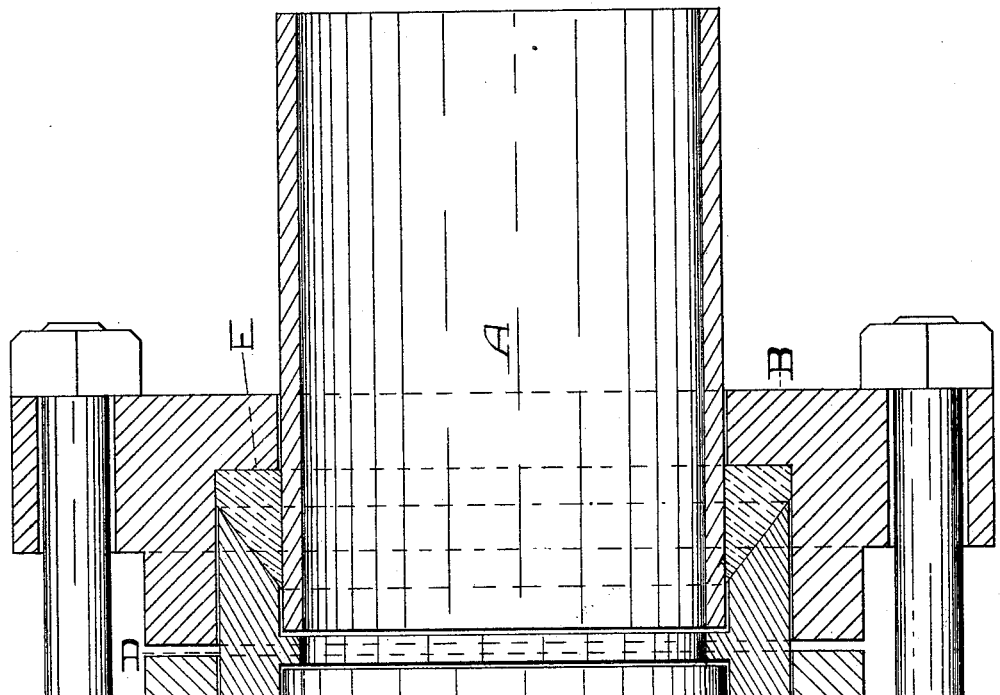

UNITED STATES PATENT OFFICE.

SOLOMON R. DRESSER, OF BRADFORD, PENNSYLVANIA.

PIPE-COUPLING.

SPECIFICATION forming part of Letters Patent No. 406,035, dated July 2, 1889.

Application filed August 18, 1887. Serial No. 247,307. (No model.)

*To all whom it may concern:*

Be it known that I, SOLOMON R. DRESSER, a citizen of the United States, residing at Bradford, in the county of McKean and State of Pennsylvania, have invented certain new and useful Improvements in Pipe-Couplings; and I do hereby declare the following to be a full, clear, and exact description of the invention, such as will enable others skilled in the art to which it appertains to make and use the same.

The figure represents a vertical longitudinal section of my coupling.

The object of my invention is to provide a perfectly-tight coupling for plain ends of pipe without utilizing the pressure of the material conveyed in said pipe to compress packing-rings E and E', as in my former patents. I accomplish this by inclosing the ends of the pipe in a loose ring, with a narrow rim or lugs at or near the center of loose ring for the ends of the pipe to abut against, so the loose ring will cover as much of one pipe end as the other. Said loose ring D is beveled from the outer diameter at the ends to the inner diameter, so as to produce beveled or tapering recesses between the loose ring and pipes A and A' to compress the wedge-shaped compressible packing-rings into the said bevel-shaped recesses of the loose ring by mechanically drawing together the sections of pipe-coupling B and B'. These sections of coupling are recessed for packing-rings E and E' and ends of loose ring D.

In uniting pipes with this coupling-section of coupling B compressible packing-ring E and loose ring D are put on pipe A, and section of coupling B' and compressible packing-ring E' are put on pipe A'. When the pipe A' is placed in line of pipe A and into loose ring D, their ends will abut against the shoulder made by narrow rim or lugs in said loose ring.

I am aware that pipe-couplings formed of two sections and having a metallic compressing-ring inclosed by the sections and rubber rings or packings which are square in cross-section and placed between the ends of the compressing-ring and the inside of the section, so that when the sections are drawn together by means of the bolts the rubber rings will be compressed against the side of the pipes to be coupled, are old. My device differs from such construction in that in the latter a uniform pressure along the face next the pipes is impossible, as it is well known that rubber rings, whether square or round in cross-section, if compressed by pressing upon the ends, will have the greatest expansion at their peripheral center and gradually decreasing expansion toward the ends.

I am also aware that pipe-couplings formed of two sections and having a compressing-ring with inclined faces, the apex of which is inserted between the ends of pipe to be joined, rubber rings square in cross-section and placed at the ends of the compressing-ring, and washers formed of two or more segments between the rubber rings and the inner side of the couplings, are old. My device differs from that form in that in the latter the rubber rings do not conform to but must be compressed into the shape of the space between the compressing-ring and the washers, and the full effect of the pressure is not had upon the pipe, as more or less of the elasticity is lost in making the rings conform to the shape of said space, whereas in my device rings conform to the shape of the space in which they are placed and fit therein in a snug manner, and by forming the rings with an inclined or beveled outer face and the compressing-rings with inclined or beveled inner faces the pressure upon that part of the rubber against the pipe is uniform from end to end.

I therefore claim as new—

1. A pipe-coupling formed of two sections and having a compressing-ring with inclined or beveled inner faces, and compressible rings having inclined or beveled outer faces and conforming before compression to the shape of and fitting in the space between the inside of the coupling-sections and the compressing-ring, substantially as described.

2. A pipe-coupling formed of two sections and having a compressing-ring with inclined or beveled inner faces and an inner rim or lugs at or near the center of the inside, and compressible rings having inclined or beveled outer faces and conforming before compression to the shape of and fitting in the space between the inside of the coupling-sections and the compressing-ring, substantially as described.

In testimony whereof I affix my signature in presence of two witnesses.

SOLOMON R. DRESSER.

Witnesses:
G. CHAPMAN,
G. W. CASSEDY.